US012777393B2

(12) United States Patent
Fiorentino

(10) Patent No.: US 12,777,393 B2
(45) Date of Patent: Oct. 27, 2026

(54) METHOD FOR HANDOVER OF USER EQUIPMENT ONBOARD A VEHICLE

(71) Applicant: Vincenzo Fiorentino, Nuremberg (DE)

(72) Inventor: Vincenzo Fiorentino, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 406 days.

(21) Appl. No.: 18/212,704

(22) Filed: Jun. 21, 2023

(65) Prior Publication Data

US 2023/0422133 A1 Dec. 28, 2023

(30) Foreign Application Priority Data

Jun. 22, 2022 (EP) .................................... 22180425

(51) Int. Cl.
*H04W 36/32* (2009.01)

(52) U.S. Cl.
CPC ................................. *H04W 36/322* (2023.05)

(58) Field of Classification Search
CPC ..... H04W 8/005; H04W 48/10; H04W 88/04; H04W 76/11; H04W 92/18; H04W 76/14
See application file for complete search history.

(56) References Cited

U.S. PATENT DOCUMENTS

| | | | | |
|---|---|---|---|---|
| 11,044,688 | B2 | 6/2021 | Slanina | |
| 11,290,928 | B1 * | 3/2022 | Vivanco | H04W 36/00835 |
| 2010/0177738 | A1 | 7/2010 | Min et al. | |
| 2013/0003697 | A1 * | 1/2013 | Adjakple | H04W 40/34 370/331 |
| 2021/0007039 | A1 * | 1/2021 | Salahuddeen | H04L 69/164 |

FOREIGN PATENT DOCUMENTS

| | | | | | |
|---|---|---|---|---|---|
| EP | 2947916 | A2 | | 11/2015 | |
| EP | 3242505 | A1 | * | 11/2017 | H04W 36/324 |
| GB | 2548376 | A | | 9/2017 | |
| JP | 2013168730 | A | * | 8/2013 | H04W 36/324 |

* cited by examiner

*Primary Examiner* — Mandish K Randhawa
(74) *Attorney, Agent, or Firm* — Lempia Summerfield Katz LLC

(57) ABSTRACT

A method of performing handover of one or more user equipment on a vehicle, by a first base station including at least one radio unit onboard the vehicle, is provided. The method includes determining location information of the at least one radio unit onboard the vehicle, determining a distance to a first vehicle station based on the location information of the at least one radio unit onboard vehicle, and performing a forced handover of the one or more user equipment connected to the at least one radio unit from the first base station to a second base station based on the determined distance. The second base station is within a proximity of the first vehicle station. The at least one radio unit onboard the vehicle is deactivated for a first time period.

14 Claims, 5 Drawing Sheets

METHOD FOR HANDOVER OF USER EQUIPMENT ONBOARD A VEHICLE

This application claims the benefit of European Patent Application No. EP 22180425.5, filed on Jun. 22, 2022, which is hereby incorporated by reference in its entirety.

BACKGROUND

The current disclosure relates to wireless communication techniques in industrial environments, especially in relation to communication in relation to vehicles used within industrial environments. Due to the nature of industrial applications, associated communications are to provide high availability and reliability.

SUMMARY AND DESCRIPTION

The present embodiments relate to wireless communication in the context of industrial automation. As mentioned above, due to the critical nature of industrial applications, high availability and reliability are to be provided. This is particularly the case in relation to vehicles and other such mobile equipment used in the context of industrial automation. However, this is particularly challenging in the context of trains and other such long distance transportation.

For example, onboard coverage for industrial and passenger equipment in trains is difficult, as coverage of mobile operator networks is not always optimized for the train tracks.

Conventionally, train network infrastructure includes cellular routers that connect to the mobile operator network, which are connected local WLAN equipment that provide indoor coverage to the industrial and passenger equipment using WLAN. Although the cellular routers may have multiple SIMs to connect to a number of operators and choose the best among them, this solution will not necessarily deliver a good and reliable service since the coverage of the mobile operator network is often poor. The cellular routers often share the same antenna site, resulting in no real difference amongst the different mobile operators. Most rail tracks are in rural areas where the coverage is achieved with 2G networks that do not have a sufficient data rate. Further, the propagation conditions may be hostile due to the landscape, mountains, train speed, and indoor propagation inside the train. Because of this, industrial and passenger equipment often suffer from loss of coverage and poor service quality.

In an approach, this issue is addressed by providing a dedicated 5G network for transmission of packets from the industrial and passenger equipment onboard the train. The dedicated 5G network includes a radio unit located on the vehicle, for providing network connectivity to one or more user equipment onboard a vehicle. The radio unit belongs to a distributed base station and is connected to a 5G network core. In an example, the 5G network core is the home network or is connected to the home network associated with at least one user equipment from the one or more user equipment. By using dedicated network, the equipment onboard the vehicle do not suffer from poor coverage, as the wayside network and the dedicated network offer optimal coverage throughout the route of the vehicle; the wayside network provides a reliable connectivity to transport the protocols between the RU onboard and the core.

However, when a vehicle with such a dedicated 5G network infrastructure enters a station, the dedicated 5G network infrastructure may cause interference to the public network. Such interference may significantly affect the performance of the devices on the vehicle and in the station. Accordingly, there is a need for a method and a device that addresses the issue of interference.

Accordingly, the current disclosure describes a method of performing handover of one or more user equipment on a vehicle, by a first base station including at least one radio unit onboard the vehicle. The method includes determining location information of the at least one radio unit onboard the vehicle, determining a distance to a first vehicle station based on the location information of the at least one radio unit onboard vehicle, and performing a forced handover of one or more user equipment connected to the at least one radio unit from the first base station to a second base station based on the determined distance. The second base station is within a proximity of the first vehicle station. The method also includes deactivating the at least one radio unit onboard the vehicle for a first time period.

Accordingly, the current disclosure describes a method of performing handover by which potential interference is avoided. By providing that the radio unit of the first base station is deactivated, interference with the second base station within the proximity of the first vehicle station is avoided. Additionally, by forcings handover of the user equipment, the current disclosures provides that the deactivation of the radio unit does not affect the user experience onboard the vehicle.

In an embodiment, the method further includes activating the at least one radio unit onboard the vehicle after the first time period. Accordingly, this allows for establishment of connections between the user equipment and the radio units, when the vehicle is outside the vehicle station, and therefore, no interference with the second base station occurs.

In an embodiment, the method further includes determining a frequency range associated with the second base station prior to performing the forced handover. Accordingly, the current disclosure allows for checking the degree of interference prior to deactivating the radio units, and based on the same, the distributed unit may determine if the radio units are to be deactivated or not.

In another aspect, the current disclosure describes a first base station for performing a handover of one or more user equipment on a vehicle. The first base station includes a plurality of radio units onboard a vehicle, each radio unit connected to one or more user equipment onboard the vehicle. The first base station also includes a distributed unit connected to the plurality of radio units. The distributed unit is configured to determine location information of a first radio unit onboard the vehicle, determine a distance to a first vehicle station based on the location information of the first radio unit onboard the vehicle, and perform a forced handover of one or more user equipment connected to the radio unit from the first base station to a second base station based on the determined distance. The second base station is within a proximity of the first vehicle station. The distributed unit is also configured to deactivate the plurality of radio units onboard the vehicle for a first time period.

In an embodiment, the plurality of radio units are connected to each other over a first wireless communication network and a second optical communication network. Each radio unit includes a first network interface (also referred to as radio interfaces) connected to the first wireless communication network and a second optical interface connected to the second wired communication network. Accordingly, the second optical interface may be used when the vehicle is in the vehicle station, while the radio interfaces of the radio units are deactivated.

In an embodiment, the distributed unit is further configured to receive one or more packets for transmission to a first user equipment, and append a special header to one or more packets. The special header is indicative of a radio unit associated with the first user equipment. The special header is used for routing the packets amongst the radio units.

In an embodiment, deactivating the plurality of radio units includes deactivating the first interface associated with the first wireless communication network of each radio unit. Accordingly, there is no interference between the radio units and the second base station since the communication amongst the radio units occurs via the optical network, which does not interfere with the second base station.

In another aspect, the current disclosure describes a non-transitory storage medium for performing handover of one or more user equipment on a vehicle. The non-transitory storage medium includes one or more instructions that, when executed on one or more processors, cause the one or more processors to determine location information of a first radio unit onboard the vehicle. The one or more user equipment are connected to the first radio unit. The one or more instructions, when executed on the one or more processors, also cause the one or more processors to determine a distance to a first vehicle station based on the location information of the first radio unit onboard the vehicle, and to perform a forced handover of one or more user equipment connected to the radio unit from the first base station to a second base station based on the determined distance. The second base station is within a proximity of the first vehicle station. The one or more instructions, when executed on the one or more processors, also cause the one or more processors to deactivate the plurality of radio units onboard the vehicle for a first time period. The advantages of the method are applicable to the device and the non-transitory storage medium aspects.

DETAILED DESCRIPTION

Figure 1:
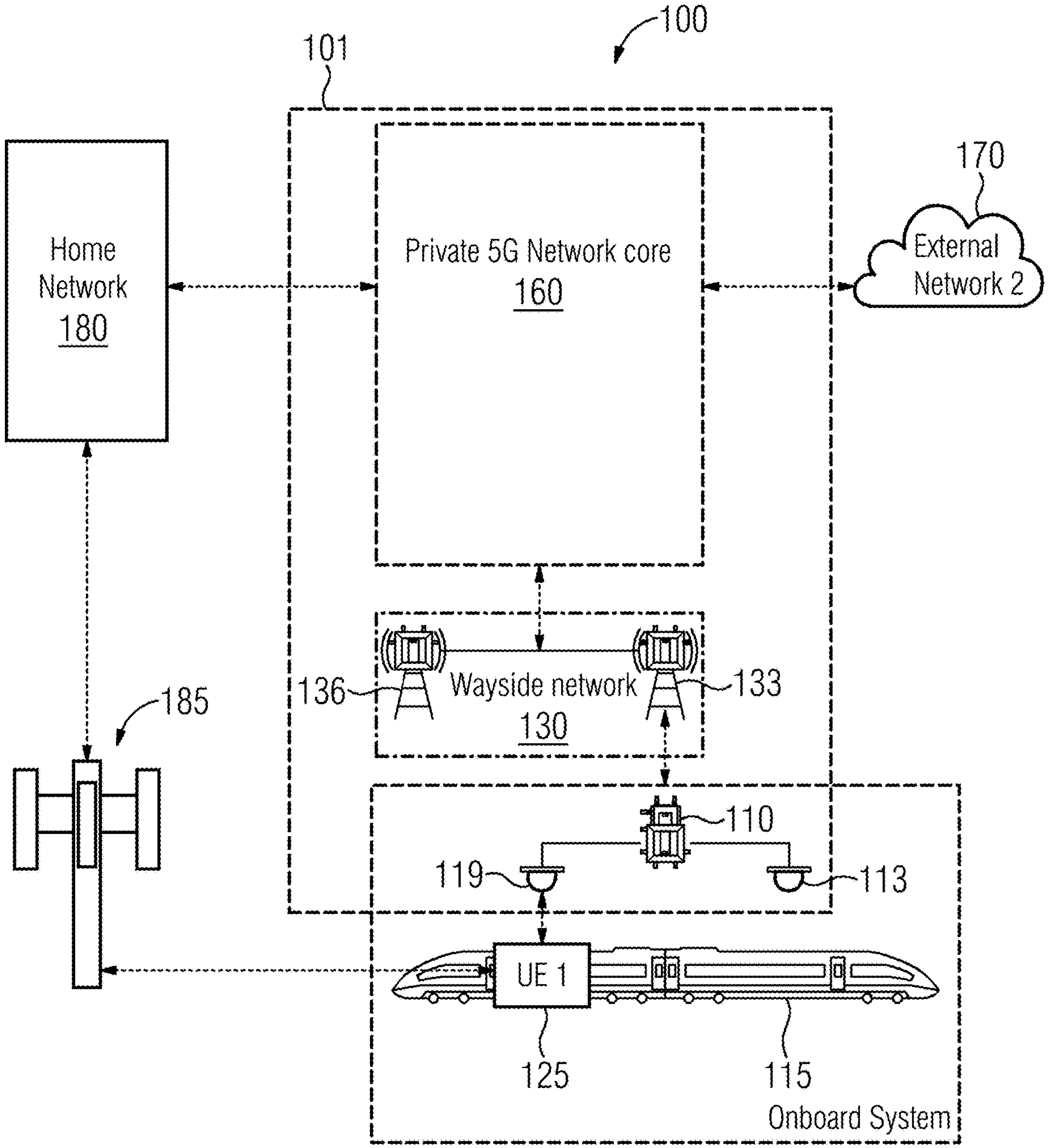
FIG. 1 illustrates one embodiment of a dedicated wireless network for communication onboard a vehicle in an industrial environment.

FIG. 1 illustrates a dedicated wireless network 101 for communication onboard a vehicle 115 in an industrial environment. Industrial environment herein refers to any environment where one or more industrial processes such as manufacturing, refining, smelting, assembly of equipment may take place and includes process plants, oil refineries, automobile factories, electrical power plants, transportation infrastructure such as railways, ships, etc. The vehicle may include a plurality of control devices connected to a plurality of field devices for monitoring and regulating one or more processes on the vehicle 115.

Vehicle herein refers to any machine capable of transporting material or personnel from one location to another. Examples of vehicles include automated guidance vehicles, mining carts, trains, automobiles, etc. The vehicle is capable of running along a predetermined route including a plurality of vehicle stations. Each vehicle station includes a stationary base station (e.g., a stationary base station 185 as shown in FIG. 1) connected to a cellular network.

The dedicated wireless network 101 includes one or more network devices installed onboard the vehicle 115 (e.g., radio unit 110) and one or more access points or antenna 119 and 113, as shown in FIG. 1. The one or more network devices onboard the vehicle 115 are connected to the network core 160 via a wayside network 130. The radio unit 110 belongs to a first base station (not shown in FIG. 1). The first base station is a distributed base station and includes a distributed unit and a central unit in addition to the radio unit 110. The first base station may include additional radio units (not shown in FIG. 1) that may also be present onboard the vehicle 115 along with the radio unit 110.

The one or more network device installed onboard the vehicle 115 are connected to a network core 160 via a wayside network 130. The wayside network 130 includes a plurality of network infrastructure devices 133 and 136, and includes, for example, one or more base stations including radio units, distributed units, central units, etc. As mentioned previously, the wayside network 130 is connected to the network core 160. The central units process non-real time protocols and services. The distributed units process physical level protocols and latency-critical real time services. The radio units carry out link layer and physical layer signal processing when transmitting and receiving radio signals. A plurality of well-known protocols (e.g., eCPRI) may be used for communication amongst these components. The dedicated wireless network 110 includes the network core 160 for managing and operating the dedicated wireless network 101. As mentioned previously, the network core 160 is connected to the home network 180 associated with the user equipment 125. Accordingly, the network core 160 is configured to transmit the packets to the corresponding home network 180. Accordingly, network connectivity is provided between the user equipment and the home network.

As mentioned previously, the vehicle is configured to move along a path including a plurality of vehicle stations. As mentioned previously, each vehicle station includes a stationary base station connected to a home network of at least one user equipment. Accordingly, when the vehicle enters the station, the user equipment may connect to the home network directly via the stationary base stations in the station. Accordingly, the base stations of the dedication wireless network are configured to handover the user equipment to the stationary base station as the vehicle arrives at the station and switch of the radio units in order to reduce wireless interference. This is further explained in reference to FIG. 2.

Figure 2:
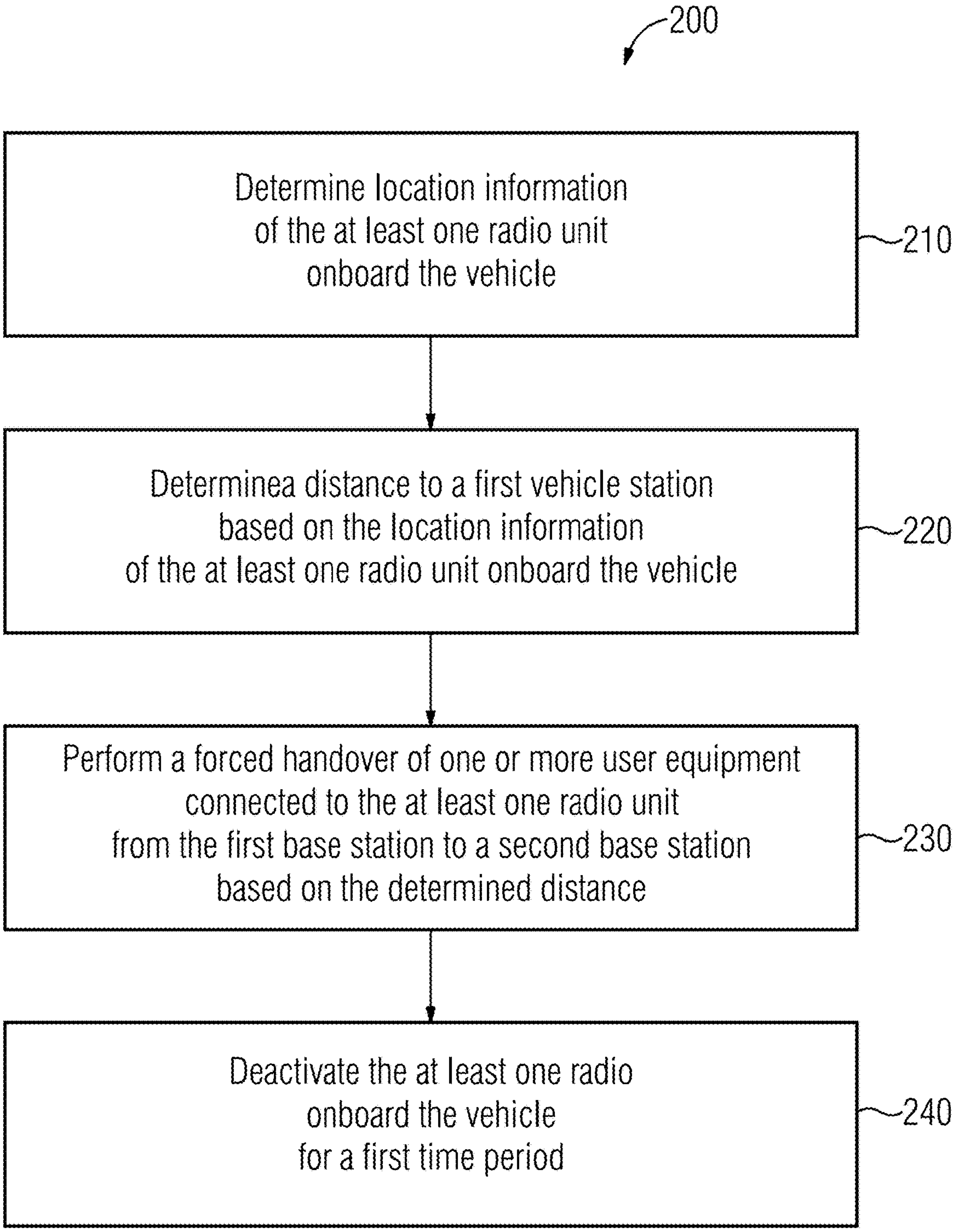
FIG. 2 illustrates one embodiment of a method of performing handover of one or more user equipment on a vehicle.
Figure 3:
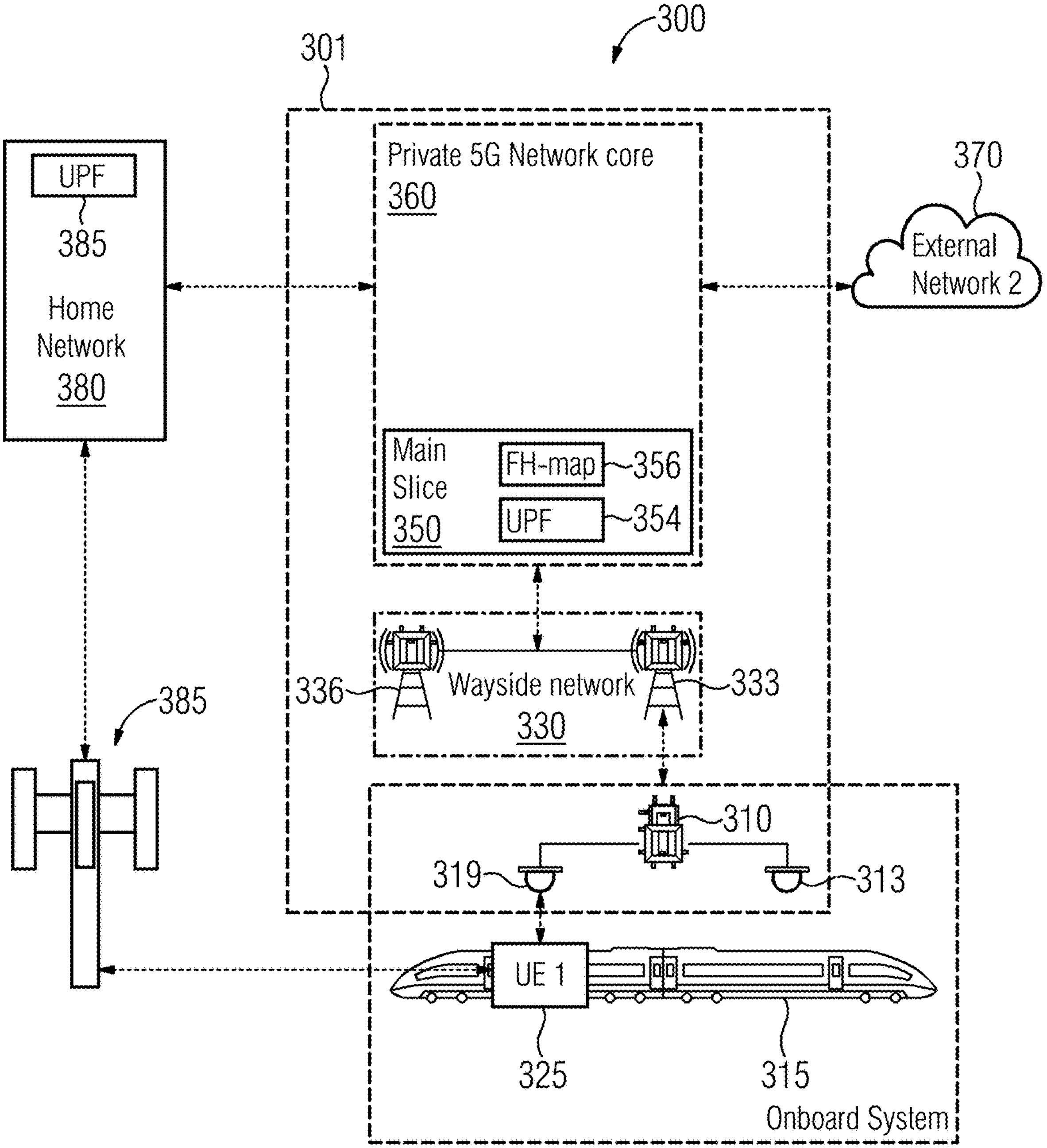
FIG. 3 illustrates one embodiment of a dedicated wireless network for communication onboard a vehicle in an industrial environment.

FIG. 2 illustrates one embodiment of a method 200 of performing handover of one or more user equipment 125 on a vehicle 115 by a first base station. As mentioned previously, the first base station includes the radio unit 110 onboard the vehicle 115. In an example, the method 200 is performed by a distributed unit of the first base station in coordination with the network core 160. At act 210, the distributed unit determines location information of the at least one radio unit 110 onboard the vehicle 115. In an embodiment, the distributed unit coordinates with a location manager function of the network core 160, associated with the radio unit, to determine the location information of the radio unit. Location information herein refers to information indicative of the location of the radio unit. Since the vehicle is in motion, the location information is dynamic, and therefore, the distributed unit coordinated with location manager regularly to get the information about the location of the radio unit. The location manager determines the location information using one or more localization standards and techniques such as GPS, GLONASS, etc.

Then at act 220, the distributed unit determines a distance to a first vehicle station based on the location information of the at least one radio unit 110 onboard the vehicle 115. Based on the location information of the at least one radio unit 110, the distributed unit determines the nearest vehicle station (e.g., the first vehicle station) at which the vehicle has a stop. In an example, the distributed unit includes information related to the route of the vehicle including information about the vehicle stations in the route along with the location information of the vehicle stations. In another example, the distributed unit is configured to fetch the information related to the route of the vehicle. Based on the location information of the vehicle stations, the distributed unit determines the nearest vehicle station (e.g., the first vehicle station) and the distance to the nearest vehicle station. The nearest vehicle station includes a base station (e.g., second base station). The second base station is connected to a home network associated with a user equipment from the one or more user equipment onboard the vehicle. The second base station 185 is within a proximity of the first vehicle station.

Then, at act 230, the distributed unit performs a forced handover of one or more user equipment 125 connected to the at least one radio unit 110 from the first base station to a second base station 185 based on the determined distance. Based on the determined distance to the nearest vehicle station (e.g., the first vehicle station), the distributed unit determines a time instance at which the handover (e.g., from the first base station to the second base station) would be possible, based on the information location of the first vehicle station. The distributed unit then at the determined time instance, conducts a forced handover of the one or more user equipment connected to the first base station, to the second base station. The forced handover may be performed in accordance with one or more techniques already known in the state of the art. In an example, based the determined distance, the distributed unit may receive an instruction for performing the handover from the access and mobility management function (AMF) in the network core 160.

Then, at act 240, the distributed unit deactivates the at least one radio unit 110 onboard the vehicle 115 for a first time period. Subsequent to the forced handover of the user equipment, the distributed unit deactivates the radio units to avoid interference with the second base station. In an embodiment, deactivation of the radio unit refers to deactivation of the radio interfaces (e.g., the radio modules and antennas). Any other interfaces that are not wireless in nature, such as wired and optical interfaces, are not deactivated, and communication may still take place over these interfaces. This is further explained in reference to FIG. 4.

While the above method 200 is explained in relation to the vehicle entering the vehicle station, the method 200 may be modified by a person skilled in the art to address other situations. For example, the method 200 may also be performed based on the location of the radio unit onboard the vehicle and the status of the radio unit in relation to surrounding interference.

For example, when the vehicle is in the station, a user equipment may enter the vehicle. In this situation, the radio unit onboard the vehicle does not interfere with the public network covering the station. The user equipment will report to the network the measurement of the signal received from the onboard RU. The AMF of the home network may send handover instructions to the UE to move to the onboard cell.

In another example, the vehicle is in the vehicle station, and the onboard radio unit is switched off in accordance with the method 200. Once the vehicle moves outside, the position of the onboard radio unit is sent to the Location/Interference manager that commands the distributed unit to switch on the radio units onboard the train. Upon switching on the radio units, the distributed unit would perform a handover of the user equipment from the base station in the vehicle station to the onboard radio unit.

The first time period is determined based the information associated with the first vehicle station. In an embodiment, information associated with the first vehicle station includes a period for which the vehicle stays at the first vehicle station (also referred to as dwell time). Based on the dwell time, the distributed unit determines the first time period for which the radio units are deactivated. In an embodiment, the distributed unit activates the at least one radio unit 110 onboard the vehicle 115 after the first time period. For example, the vehicle leaves the station after the dwell time, and the distributed unit activates the radio units.

In an embodiment, the distributed unit determines a frequency range associated with the second base station prior to performing the forced handover. The frequency range is stored in the information associated with the first vehicle station. Based on the frequency range, the distributed unit determines the degree of interference and determines if the radio units have to be deactivated or not. For example, if the frequency range associated with the second base station is not impacted by the frequencies used by the radio units, the distributed unit does not deactivate the radio units.

Accordingly, as described above, the disclosure describes a method by which interference between the second base station and the radio units onboard the vehicle is eliminated. By forcing the handover of the user devices or user equipment to the second base station, the current disclosure provides that network connectivity is not disrupted due to the deactivation of radio units for the purpose inference handing.

However, such deactivation of radio units may affect implementation of changes in network policy across the radio units. Accordingly, in order to address this, the radio units are connected to each other via an optical fiber connection in addition to the wireless network. To handle interference, the wireless interfaces of the radio units are deactivated, while the optical interfaces remain active, thereby allowing for communication between the radio units and the distributed unit over the wired network. This is further explained in reference to FIG. 4.

Figure 4:
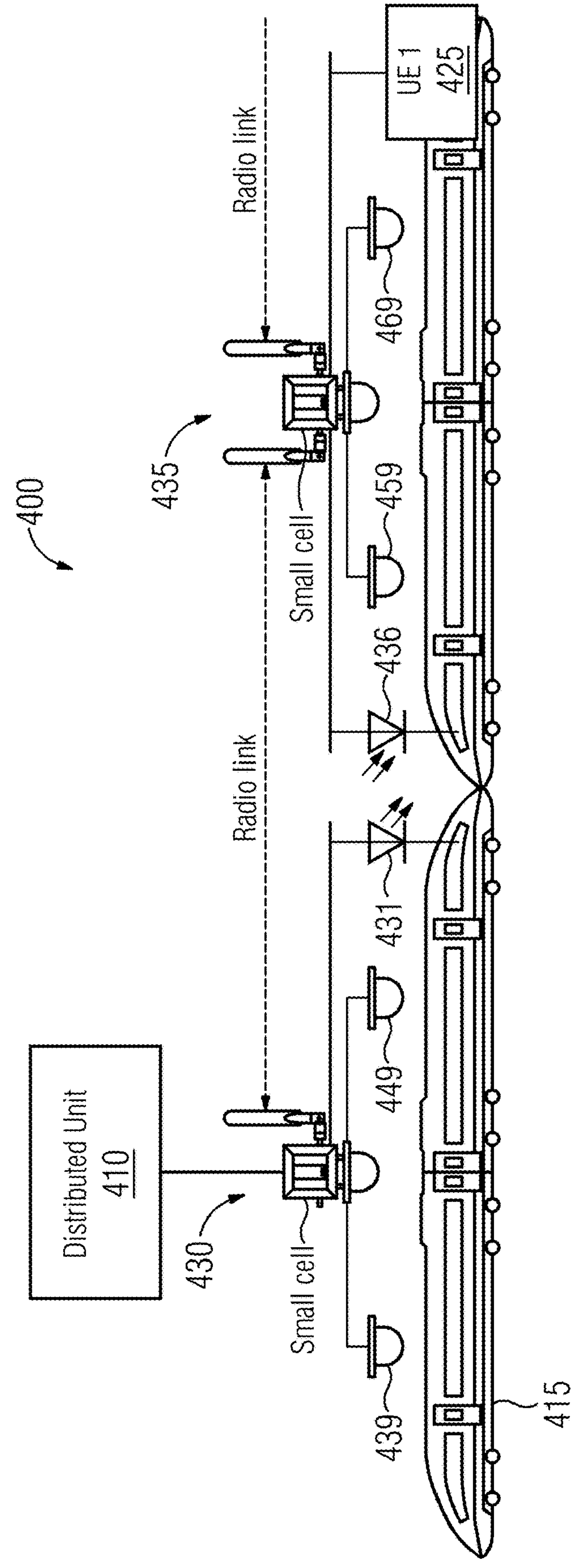
FIG. 4 illustrates one embodiment of a dedicated wireless network with a plurality of radio units with two side links, for communication onboard a vehicle in an industrial environment.
Figure 5:
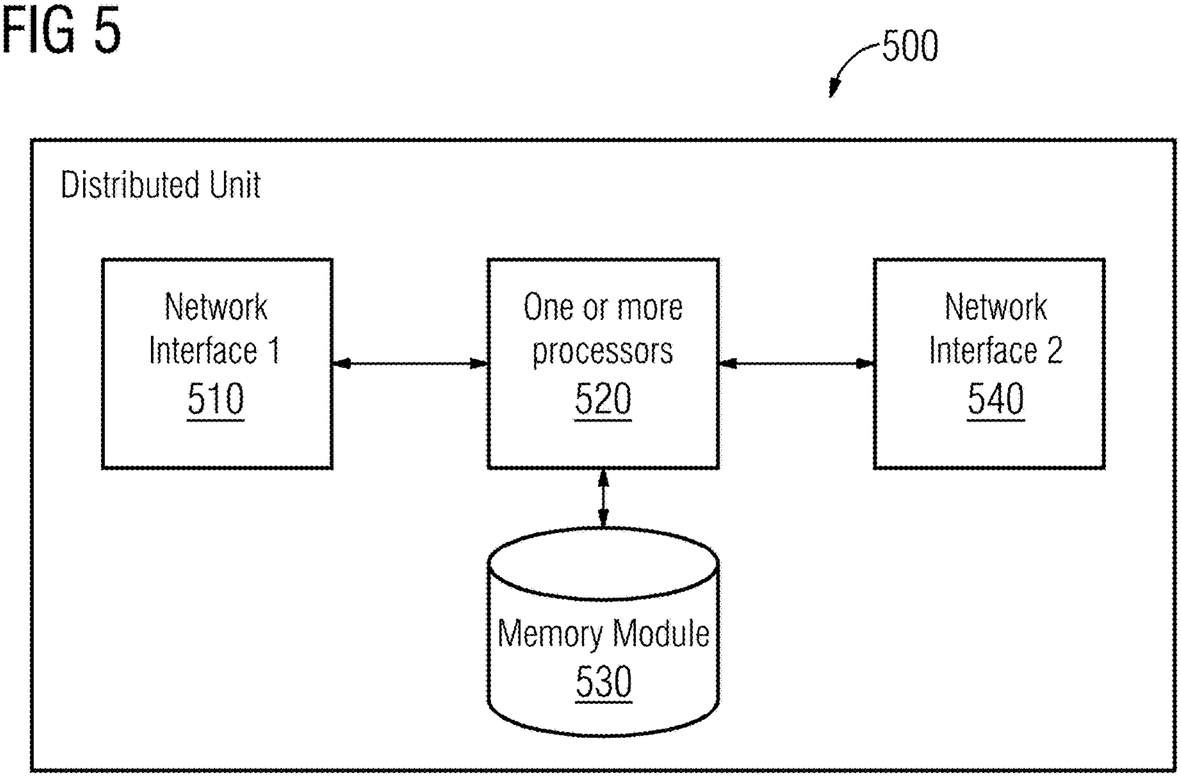
FIG. 5 illustrates one embodiment of a device for performing handover of one or more user equipment on a vehicle.

FIG. 4 illustrates another dedicated wireless network for communication onboard a vehicle 415 in an industrial environment. Accordingly, the dedicated wireless network includes the network devices onboard the vehicle 415 and the wayside network (not shown in FIG. 4). As shown in FIG. 4, the dedicated wireless network includes a plurality of radio units 430, 435 for providing network connectivity to the user equipment 425 onboard the vehicle 415. The plurality of radio units 430, 435 may be connected to the distributed unit 410. In an example, the distributed unit 410 may be onboard the vehicle 415. Each radio unit of the plurality of radio units 430, 435 is connected to the other radio units over an optical fiber network and a wireless network. The wireless network is a subnetwork of the dedicated wireless network. Each radio unit may be connected to one or more antennas 439, 449,459,469.

Additionally, each radio unit of the plurality of radio units 430, 435 is equipped with an optical interface 431, 436 to communicate to another radio unit and with a radio interface or a wireless interface also to communicate to other radio units. To provide robustness of the connection, optical and radio links are used amongst the plurality of radio units 430, 435. In an embodiment, the optical signal is conducted via cable to the coach end, on both sides, and via an optical connection, the data is passed from one coach to the other. In an embodiment, the distributed unit 410 is also connected to the optical fiber network.

Accordingly, the current disclosure provides for optical connection amongst the radio units that may be used, particularly when the wireless interfaces are deactivated. Additionally, the optical connections may allow for path redundancy. For example, the radio units may communicate packets amongst each other over both the wireless and the optical link to provide that packets arrive at the destination radio unit. In an embodiment, to provide effective use of such multi-network linkage, the format of fronthaul frame is modified. The fronthaul frame includes an additional header indicative of the destination radio unit. When a radio unit receives such a frame from either another radio unit or from the distributed unit, the frame is analyzed by the radio unit. If the destination is the current radio, the header section is removed from the frame, and the radio unit then forwards the packet to the user equipment associated with the packet. If the destination radio unit as mentioned in the header in the frame is another RU, the radio unit forwards the frame including the header to the other radio units via the wireless and optimal links. Via these two interfaces, the frame is sent to the neighboring radio units.

In an embodiment, the radio unit 310 belongs to the home network 380, and the wayside network 330 and network core 360 act as a tunnel/transport layer between the radio unit 310 and the home network 380, which are transparent to the user equipment connected to the home network 380. Accordingly, the radio unit 310 acts as an extension of the home network 380. Accordingly, the network core 360 includes a user plane function 354 that is responsible for transporting packets over the wayside network and the network core 360. This is distinct from the user plane function 385 of the home network 380. In an example, the radio unit 310 is configured to wrap and unwrap the packets to/from the user equipment in relation to one or more protocols associated with the wayside network and network core. In another example, the user equipment 325 is configured to wrap and unwrap the packets to/from the user equipment in relation to one or more protocols associated with the wayside network and network core. For example, the radio unit or the user equipment is capable of mapping wrapping and unwrapping protocols into/out of the protocols (e.g., including fronthaul protocols) associated with the home network 180 and the network core 160. For example, a fronthaul map function (e.g., shown as FH-map 356) is implemented in the network core 360. The fronthaul map function is for wrapping the packets to the user equipment and for unwrapping the packets to the home network. For example, different fronthaul protocols may be used between the network core 360 and the home network 380. Since the packets are transported to the home network via the network core and the wayside network, the fronthaul (FH) protocols of the home network are wrapped in the protocols of the network core and the wayside network. The fronthaul map function manages the translation of the flow of information between the home network and network core (e.g., including wayside network). Such wrapping and unwrapping may also be performed accordingly for other protocols as needed. For example, when small cell specification is used at the RU (e.g., RU acting as a small cell), appropriate wrapping and unwrapping of protocols may be performed for the transport of the packets from the small cell RU to the home network via the wayside network and the network core.

In an example, the network core may include two or more network slices: a first network slice (also referred to as onboard slice) and a second network slice (also referred to as the main slice). The first network slice handles communication between the user equipment onboard the vehicle and external networks such as the home network associated with at least one user equipment. The first network slice includes a plurality of network functions for handling and managing the communication associated with the user equipment. The second network slice manages and handles the wayside network and the communication occurring over the wayside network. The second network slice includes a plurality of network functions. The wayside network and the second network slice are responsible for transporting packets associated with the first network slice. The wayside network and second network slice act as a dedicated tunnel between the user equipment on the vehicle and the first network slice, which allows for transportation of packets associated with the first network slice over the user plane of the second network slice.

The present disclosure may take a form of a computer program product including program modules accessible from computer-usable or computer-readable medium storing program code for use by or in connection with one or more computers, processing units, or an instruction execution system. For example, the distributed unit may be realized across one or more devices.

For example, accordingly, the current disclosure describes a device 500. The device 500 implements the method 200. The device 500 includes one or more network interfaces 510, 540, one or more processors 520, and a non-transitory storage medium 530. The non-transitory storage medium 530 includes a plurality of instructions for implementing the method 200. The plurality of instructions, when executed on one or more processors 520, cause the one or more processors 520 to determine location information of a first radio unit 110 onboard the vehicle 115, determine a distance to a first vehicle station based on the location information of the first radio unit 110 onboard the vehicle 115, and perform a forced handover of one or more user equipment 125 connected to the radio unit 110 from the first base station to a second base station 185 based on the determined distance. The second base station 185 is within a proximity of the first vehicle station. The plurality of instructions, when executed on the one or more processors 520, also cause the one or more processors 520 to deactivate the plurality of radio units onboard the vehicle 115 for a first time period.

For the purpose of this description, a computer-usable or computer-readable non-transitory storage medium may be any apparatus that may contain, store, communicate, propagate, or transport the program for use by or in connection with the instruction execution system, apparatus, or device. The medium may be electronic, magnetic, optical, electromagnetic, infrared, or a semiconductor system (or apparatus or device); propagation mediums in and of themselves as signal carriers are not included in the definition of physical computer-readable medium. Physical computer-readable medium may include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology may be centralized or distributed (or a combination thereof) as known to those skilled in the art.

While the current disclosure is described with references to a number of industrial devices, a plurality of industrial devices may be utilized in the context of the current disclosure. While the present disclosure has been described in detail with reference to certain embodiments, the present disclosure is not limited to those embodiments. In view of the present disclosure, many modifications and variations would present themselves to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All embodiments claimed in method claims may also be applied to device/non transitory storage medium claims.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of performing handover of one or more user equipment onboard a vehicle, by a first base station onboard the vehicle, the first base station comprising a distributed unit onboard the vehicle and at least one radio unit onboard the vehicle, the method comprising:

determining, by the distributed unit onboard the vehicle, location information of the at least one radio unit onboard the vehicle;

determining, by the distributed unit onboard the vehicle, a distance to a first vehicle station based on the location information of the at least one radio unit onboard the vehicle;

performing, by the distributed unit onboard the vehicle, a forced handover of the one or more user equipment connected to the at least one radio unit from the first base station onboard the vehicle to a second base station based on the determined distance, wherein the second base station is within a proximity of the first vehicle station; and deactivating, by the distributed unit onboard the vehicle, the at least one radio unit onboard the vehicle for a first time period, wherein the first time period is determined based on dwell time information associated with the first vehicle station.

2. The method of claim 1, further comprising activating, by the distributed unit onboard the vehicle, the at least one radio unit onboard the vehicle after the first time period.

3. The method of claim 1, further comprising determining, by the distributed unit onboard the vehicle, a frequency range associated with the second base station prior to performing the forced handover.

4. The method of claim 1, wherein the at least one radio unit belongs to a home network associated with the second base station, and wherein the at least one radio unit is connected to the home network via a wayside network.

5. The method of claim 1, wherein determining the distance to the first vehicle station comprises determining a distance to a first vehicle station at which the vehicle has a stop.

6. A first base station onboard a vehicle for performing a handover of one or more user equipment on the vehicle, the first base station comprising:

a plurality of radio units onboard the vehicle, each radio unit of the plurality of radio units being connected to the one or more user equipment onboard the vehicle; and a distributed unit onboard the vehicle connected to the plurality of radio units, wherein the distributed unit is configured to:

determine location information of a first radio unit of the plurality of radio units onboard the vehicle;

determine a distance to a first vehicle station based on the location information of the first radio unit onboard the vehicle;

perform a forced handover of the one or more user equipment connected to the first radio unit from the first base station onboard the vehicle to a second base station based on the determined distance, wherein the second base station is within a proximity of the first vehicle station; and deactivate the plurality of radio units onboard the vehicle for a first time period, wherein the first time period is determined based on dwell time information associated with the first vehicle station.

7. The first base station of claim 6, wherein the plurality of radio units are connected to each other over a first wireless communication network and a second wired communication network, and wherein each radio unit of the plurality of radio units comprises:

a first network interface connected to the first wireless communication network; and a second optical interface connected to the second wired communication network.

8. The first base station of claim 7, wherein the deactivation of the plurality of radio units includes deactivation of the first network interface associated with the first wireless communication network of each radio unit of the plurality of radio units.

9. The first base station of claim 7, wherein the deactivation of the plurality of radio units includes maintaining activation of the second optical interface associated with the second wired communication network of each radio unit of the plurality of radio units.

10. The first base station of claim 6, wherein the distributed unit onboard the vehicle is further configured to:

receive one or more packets for transmission to a first user equipment of the one or more user equipment; and append a special header to the one or more packets, wherein the special header is indicative of a radio unit of the plurality of radio units, the radio unit being associated with the first user equipment.

11. In a non-transitory computer-readable storage medium that stores instructions executable by one or more processor to perform handover of one or more user equipment onboard a vehicle, the instructions comprising:

determining, by a distributed unit onboard the vehicle, location information of a first radio unit onboard the vehicle, wherein the one or more user equipment are connected to the first radio unit;

determining, by the distributed unit onboard the vehicle, a distance to a first vehicle station based on the location information of the first radio unit onboard the vehicle;

performing, by the distributed unit onboard the vehicle, a forced handover of the one or more user equipment connected to the first radio unit from the first base station onboard the vehicle to a second base station based on the determined distance, wherein the second base station is within a proximity of the first vehicle station; and deactivating, by the distributed unit onboard the vehicle, the first radio unit onboard the vehicle for a first time period, wherein the first time period is determined based on dwell time information associated with the first vehicle station.

12. The non-transitory computer-readable storage medium of claim 11, wherein the instructions further comprise activating, by the distributed unit onboard the vehicle, the first radio unit onboard the vehicle after the first time period.

13. The non-transitory computer-readable storage medium of claim 11, wherein the instructions further comprise determining, by the distributed unit onboard the vehicle, a frequency range associated with the second base station prior to performing the forced handover.

14. The non-transitory computer-readable storage medium of claim 11, wherein the first radio unit belongs to a home network associated with the second base station, and wherein the at least one radio unit is connected to the home network via a wayside network.

* * * * *